Figure 1:
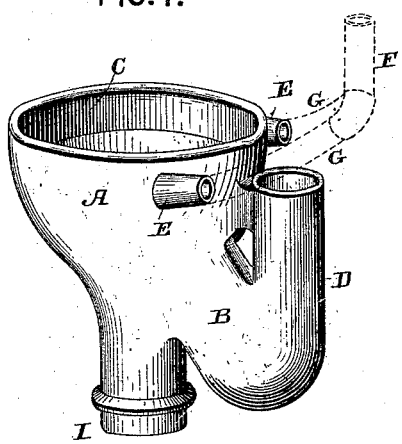

(No Model.)

W. BUNTING, Jr.
WATER CLOSET.

No. 307,520. Patented Nov. 4, 1884.

ATTEST.
J. Henry Kaiser.
Geo. T. Smallwood.

INVENTOR.
William Bunting Jr.
By J. N. McIntire
Att'y.

UNITED STATES PATENT OFFICE.

WILLIAM BUNTING, JR., OF BOSTON, MASSACHUSETTS, ASSIGNOR TO THE MEYER, SNIFFEN CO., (LIMITED,) OF NEW YORK, N. Y.

WATER-CLOSET.

SPECIFICATION forming part of Letters Patent No. 307,520, dated November 4, 1884.

Application filed April 10, 1884. (No model.)

*To all whom it may concern:*

Be it known that I, WILLIAM BUNTING, Jr., of Boston, in the county of Suffolk and State of Massachusetts, have invented certain new and useful Improvements in Water-Closets; and I do hereby declare that the following is a full, clear, and exact description thereof, reference being had to the accompanying drawings, making part of this application.

My invention relates to that kind of water-closets in which what is known as "side-delivery" basins or bowls are employed, and to that species of this kind of apparatus in which a trunk-like extension of the discharge-pipe runs upwardly nearly or quite to the upper part of the bowl, (and usually in rear thereof,) and has its upper end provided with some suitable covering device, which may be removed, when required, for the purposes of free access to the interior of said trunk-like extension, and to the trap arranged below said trunk, (when a trap may be used,) as seen, for an instance, in the United States Patent No. 253,152, granted January 31, 1882, to Dan. T. Bostel. To this species of water-closet it has been customary, (as shown in the Bostel patent,) to provide the trunk-like device with some means of ventilation at its upper end for fully and perfectly ventilating not only the trunk-like device above the trap, but also the interior of the bowl or basin of the closet; and, as heretofore constructed, closets of this species have been ventilated at this point by means of a suitable branch pipe or means of communication adapted to be coupled to any suitable ventilating tube or flue. I propose to simplify and improve the construction of this species of closet apparatus by the employment, in connection with the upper open end of the trunk-like device, of a removable cap-piece or cover, made hollow and provided with an extension adapted to be coupled with any suitable slip-joint, or other coupling device leading to the ventilating tube or flue. The said cover-like device may be adapted to be uncoupled from the ventilating-tube and to be removed from the top of the trunk at pleasure, and thus answer the double purpose of the cover or cap of the trunk, and the nozzle or branch pipe for communication with the ventilating tube or flue of the closet.

To this end and object my invention may be said to consist, essentially, in the combination, with the upper open end of the trunk of that species of water-closet mentioned, of a hollow removable cover or cap adapted to fit to the upper end of the trunk-like device, and also provided with a nozzle-like or tubular extension, adapted to be coupled or connected in any suitable manner with any desired ventilating tube or flue, all as will be hereinafter more fully explained, and will be more specifically pointed out in the claim of this application.

To enable those skilled in the art to make and use my invention, I will now proceed to more fully explain it, referring, by letters of reference, to the accompanying drawings, which form a part of this specification, and in which I have shown my invention carried out in that form in which I have so far successfully practiced it.

Figure 2:
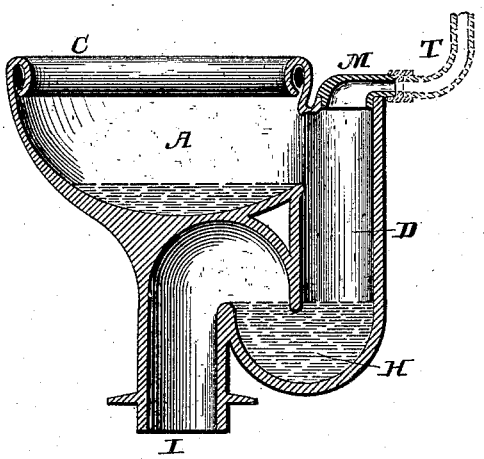
Figure 3:
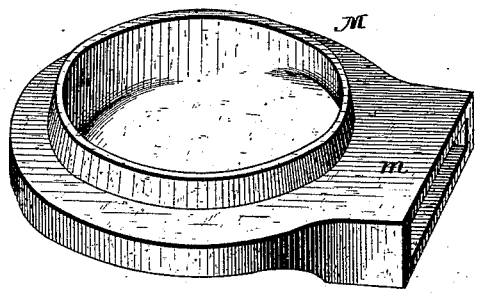

In the drawings, Figure 1 is a perspective view of an earthenware portion of a closet made according to the Bostel patent. Fig. 2 is a vertical central section of the same, with my invention added; and Fig. 3 is a detail view of the ventilating-trunk lid or cover removed from the upper parts of the apparatus.

In the several figures the same parts will be found designated by the same letter of reference, and at Fig. 1 the ventilating-cover is removed, while at Fig. 2 it appears in its proper position on the top of the trunk-like device.

A is the basin or bowl formed with a side delivery at B, (in this instance at the rear side of the closet,) and having a flushing-rim at C. The delivery opens in the vertical trunk or chamber D, the top of which is, by preference, nearly or quite level with the top of the bowl, as shown, and the flushing-rim C has, in this instance, two water-supply inlets, E E. The lower end of the trunk D communicates, in the case shown, with the trap H, and said trap in turn communicates with the soil-pipe connection I of the closet.

M is the ventilating or hollow top or cover, which is adapted to fit onto and be properly applied to the top opening of the trunk D, (as shown at Fig. 2,) and which is cast or made as shown, preferably of porcelain or earthenware, with a tubular extension, m, adapted to be coupled, by a slip-joint or other suitable connection, with any proper ventilating-tube, or through such, for instance, as shown in dotted lines at T, Fig. 2. The conformation of this ventilating-cover piece M, and its mode of application to the trunk D, will be clearly understood by reference to the drawings; but its size and shape may of course be varied to suit the judgment of the manufacturer, its only indispensable qualities being a capacity to properly fit and cover the upper open end of the trunk D, and its provision with some suitable extension-like nozzle, m, adapted to be coupled to a ventilating-tube of any size and shape in any proper or suitable manner. Of course the connection to the ventilating-tube should be such that the device M, with its projection m, may be conveniently uncoupled or disconnected from both the ventilating-tube and the top of the trunk D whenever it may be necessary, for the purpose of free access to said trunk.

At Fig. 1, I have shown, in dotted lines at F, an ordinary water-supply pipe, the branches G G of which are supposed to be properly connected, when the closet is set up, with the two inlets E E to the flushing-rim of the bowl.

The general operation of a closet such as shown and described, and embracing my improvement and invention, is of course substantially the same as those already in use of the species shown in the drawings; but with my invention added, this species of closet not only possesses all the advantages common to this kind of apparatus, and a perfect capacity for free access to the trunk E and trap beneath it, whenever occasion may require, as well as proper means for perfectly-free ventilation of both the trunk and the open portion of the bowl of the closet through the medium of the ventilating-trunk cover M, but may have its trunk-like portion D simple and economically made, without any ventilating-nozzle or extension device, for the purpose of ventilating the bowl of the closet, the means for such ventilation being afforded, as shown, through the medium of the cover M, which heretofore has been made in the simple form of a solid top piece.

What I claim as new, and desire to secure by Letters Patent, is—

In combination with the upper open end of the trunk-like device D of a side-delivery water-closet bowl, a removable cover or top piece, M, formed or provided with means by which an open communication may be formed between the upper interior portion of the trunk and any suitable ventilating flue or pipe detachably connected with said cover, substantially in the manner and for the purposes set forth.

In witness whereof I have hereunto set my hand this 5th day of April, 1884.

WM. BUNTING, JR.

In presence of—
F. J. McRAE,
FRANK McCONNERS.